United States Patent
McMorran (10) Patent No.: US 12,339,885 B1
(45) Date of Patent: Jun. 24, 2025

(54) VIRTUAL DIRECTORY FOR SOURCE CODE NAVIGATION

(71) Applicant: MICROSOFT TECHNOLOGY LICENSING, LLC., Redmond, WA (US)

(72) Inventor: Benjamin John McMorran, Redmond, WA (US)

(73) Assignee: Microsoft Technology Licensing, LLC., Redmond, WA (US)

(*) Notice: Subject to any disclaimer, the term of this patent is extended or adjusted under 35 U.S.C. 154(b) by 0 days.

(21) Appl. No.: 18/392,747

(22) Filed: Dec. 21, 2023

(51) Int. Cl.
| | |
|---|---|
| G06F 17/00 | (2019.01) |
| G06F 7/00 | (2006.01) |
| G06F 8/30 | (2018.01) |
| G06F 8/70 | (2018.01) |
| G06F 16/188 | (2019.01) |
| G06F 16/334 | (2025.01) |
| G06F 16/338 | (2019.01) |

(52) U.S. Cl.
CPC ............ *G06F 16/338* (2019.01); *G06F 8/30* (2013.01); *G06F 8/70* (2013.01); *G06F 16/188* (2019.01); *G06F 16/334* (2019.01)

(58) Field of Classification Search
CPC .... G06F 16/338; G06F 16/334; G06F 16/188; G06F 8/30; G06F 8/70
USPC .......................................................... 707/723
See application file for complete search history.

(56) References Cited

U.S. PATENT DOCUMENTS

| | | | |
|---|---|---|---|
| 10,824,455 B2 * | 11/2020 | Arikatla | G06F 9/45558 |
| 2003/0115218 A1 * | 6/2003 | Bobbitt | G06F 3/0613 |
| | | | 707/999.2 |
| 2017/0199878 A1 * | 7/2017 | Ramasamy | G06F 16/93 |
| 2018/0373507 A1 * | 12/2018 | Mizrahi | G06F 18/24 |
| 2020/0097389 A1 * | 3/2020 | Smith | G06F 11/0793 |
| 2020/0117446 A1 * | 4/2020 | Smith | G06F 8/71 |
| 2023/0062297 A1 * | 3/2023 | Eloul | G06N 3/04 |

* cited by examiner

*Primary Examiner* — Pavan Mamillapalli (57) ABSTRACT

A virtual directory is created in a software development tool that lists the files having source code components (e.g., files, functions, methods, types, classes) of a codebase that relate to a user query about the codebase. The files of the codebase are partitioned into chunks with each chunk having a respective embedding. A search for the source code components relevant to the query is performed using an embedding of the query and the chunk embeddings representing the files of codebase. As a file of the virtual directory is edited, the chunk embeddings are updated and the virtual directory is updated with a reference to the revised file.

20 Claims, 7 Drawing Sheets

VIRTUAL DIRECTORY FOR SOURCE CODE NAVIGATION

BACKGROUND

A codebase is a collection of software files used to build an application. The codebase includes, without limitation, source code files, script files, readme files, configuration files, test files, build files, etc. Navigating a large codebase is challenging when the codebase lacks comprehensive documentation, contains outdated documentation, has been poorly maintained, or is associated with an unstructured file system. This makes it difficult for developers (e.g., users, programmers, etc.) to understand the source code components of the codebase and the relationships between the various components of the codebase. A developer often needs to find the files, functions or types that are associated with a particular feature of the application. The developer is left with the task of analyzing the files of the codebase to find the components in the codebase that are associated with a particular feature.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A virtual directory is created that stores references to files of a codebase that contain source code components that relate to a query pertaining to the codebase. The source code components include files, functions, methods, types and/or classes of the codebase. The files of the codebase are partitioned into small portions of code or chunks of a predetermined size. Each chunk is represented by an embedding of an embedding space. A search is performed for the source code components that relate to the query based on closely-similar chunk embeddings to the embedding of the query. The files associated with the closely-similar chunk embeddings are referenced in a virtual directory. The files of the virtual directory and their associated chunk embeddings are updated automatically when a change is made to a file.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

A virtual directory is created referencing the filenames of the files of a codebase (e.g., project) having source code components (e.g., functions, types, methods, classes, etc.) that relate to a user query regarding the contents of the codebase. The virtual directory is part of a user interface ("UI") of a software development tool, such as a source code editor or integrated development environment ("IDE").

A user issues a natural language query in the UI for source code components, such as a file, function (i.e., method), class, or type (i.e., data type) of the codebase that pertains to the query. A virtual directory is created having as its name the natural language text of the query. The virtual directory lists the files containing source code components that closely match the query in a ranked order based on their relevance to the query.

A codebase chunk table is created for a codebase and contains a portion or chunk of each file in the codebase indexed by an embedding of the chunk. A search of the codebase chunk table is made using the embedding of the user query to find chunk embeddings that are closely similar to the embedding of the user query. The files containing source code components having a closely-similar chunk embedding are then listed in the virtual directory.

The user interface displays the filenames of the files containing content (e.g., functions/methods, classes, and types) that pertains to the user query. A developer may select one of the filenames listed in the virtual directory and the one or more chunks having the closest matching embedding to the query embedding is displayed in a ranked order in the user interface.

In the event of an edit or change to the contents of a file of the codebase, the embeddings of the codebase chunk table and the altered chunks are updated. A background process runs in the user interface to monitor changes or edits made to the files of the codebase. Upon notice of an edit, the chunks and the embeddings of the codebase chunk table are updated including those displayed in the user interface.

Figure 1:
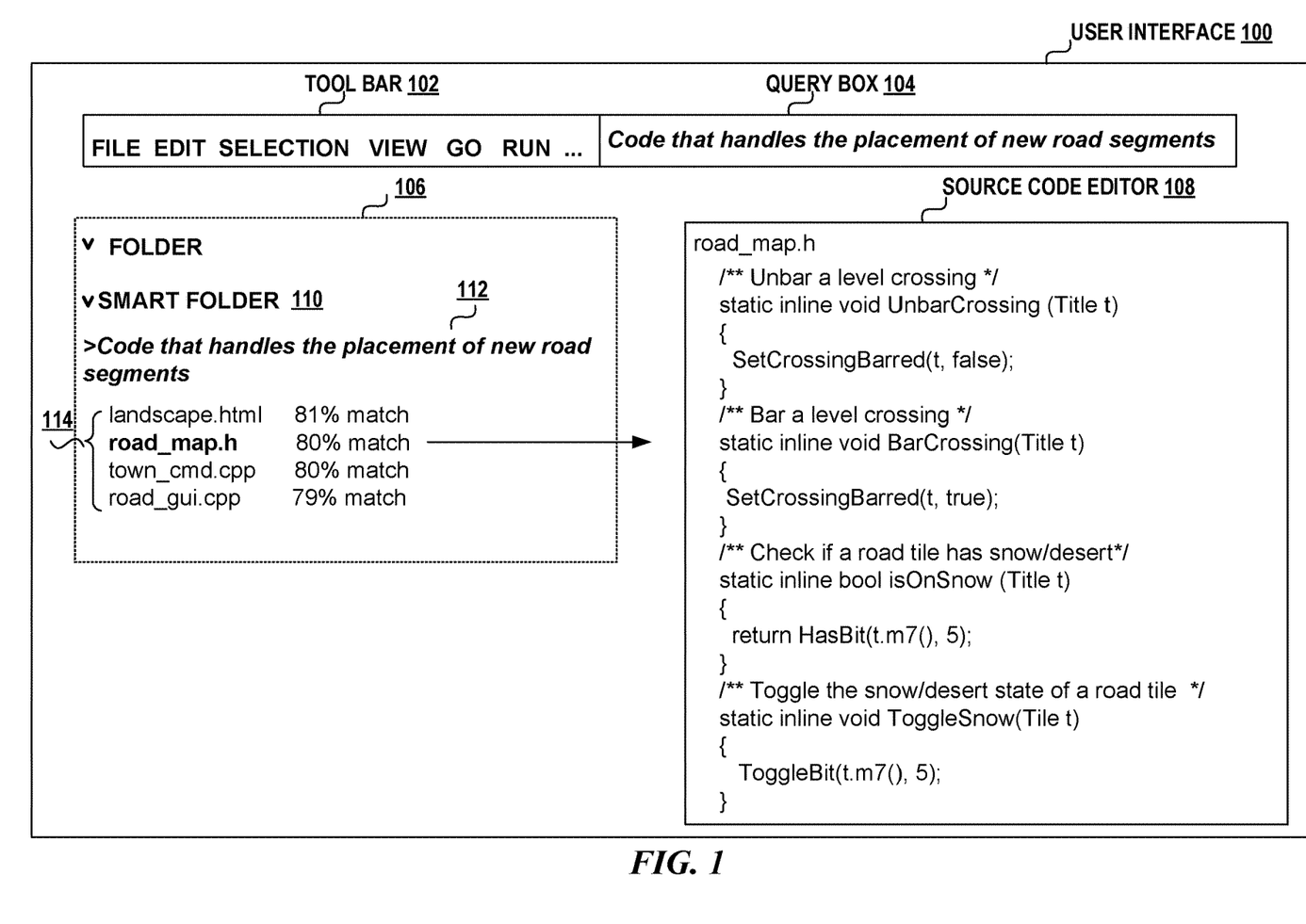
FIG. 1 illustrates an example of a user interface depicting a virtual directory listing the files of a codebase that correspond to a user's query.

Turning to FIG. 1, there is shown an example of a user interface 100. In an aspect, the user interface 100 is part of a software development tool, such as, a source code editor, integrated development environment, and the like. The user interface 100 includes a tool bar 102, a query box 104, a directory listing 106, and a source code editor window 108. The directory listing 106 includes a virtual directory named "Smart Folder" 110 containing other virtual directories or subdirectories.

A directory or folder in a file system is a hierarchical structure of a group of related files. The virtual directory is a structure that references the files containing source code components of a codebase that satisfy a user query. The virtual directory is automatically created upon receipt of the user query and updated when the files in the virtual directory are edited. In an aspect, the virtual directory exists in a user interface of a software development tool.

As the user inputs the query in the query box 104, a virtual directory 112 is created using the query as the name of the virtual directory. The query consists of the natural language text "Code that handles the placement of new road segments" and the virtual directory 112 is created with the same name.

The results of the query are displayed in the virtual directory 112. As shown in FIG. 1, the folder "Code that handles the placement of new road segments" 112 includes a ranked list of files 114 containing code components that pertain to the query. The virtual directory 112 lists landscape.html first since it has an 81% match to the query, then road_map.h followed by town_cmd.cpp, both of which have an 80% match and lastly road_gui.cpp having a 79% match.

When a user selects one of the files, the source code component pertaining to the query in the selected file is displayed in a source code editor where the user may edit the source code component as desired. As shown in FIG. 1, the user has selected road_map.h which is displayed in the source code editor 108. The source code components in the file are functions that are highlighted for the developer to recognize. Alternatively, the source code editor may scroll down to the relevant functions, types and/or classes. The source code components may be visualized using any graphical and interactive manner.

Attention now turns to a more detailed description of the system, device, and methods of the virtual directory for source code navigation.

System

Figure 2:
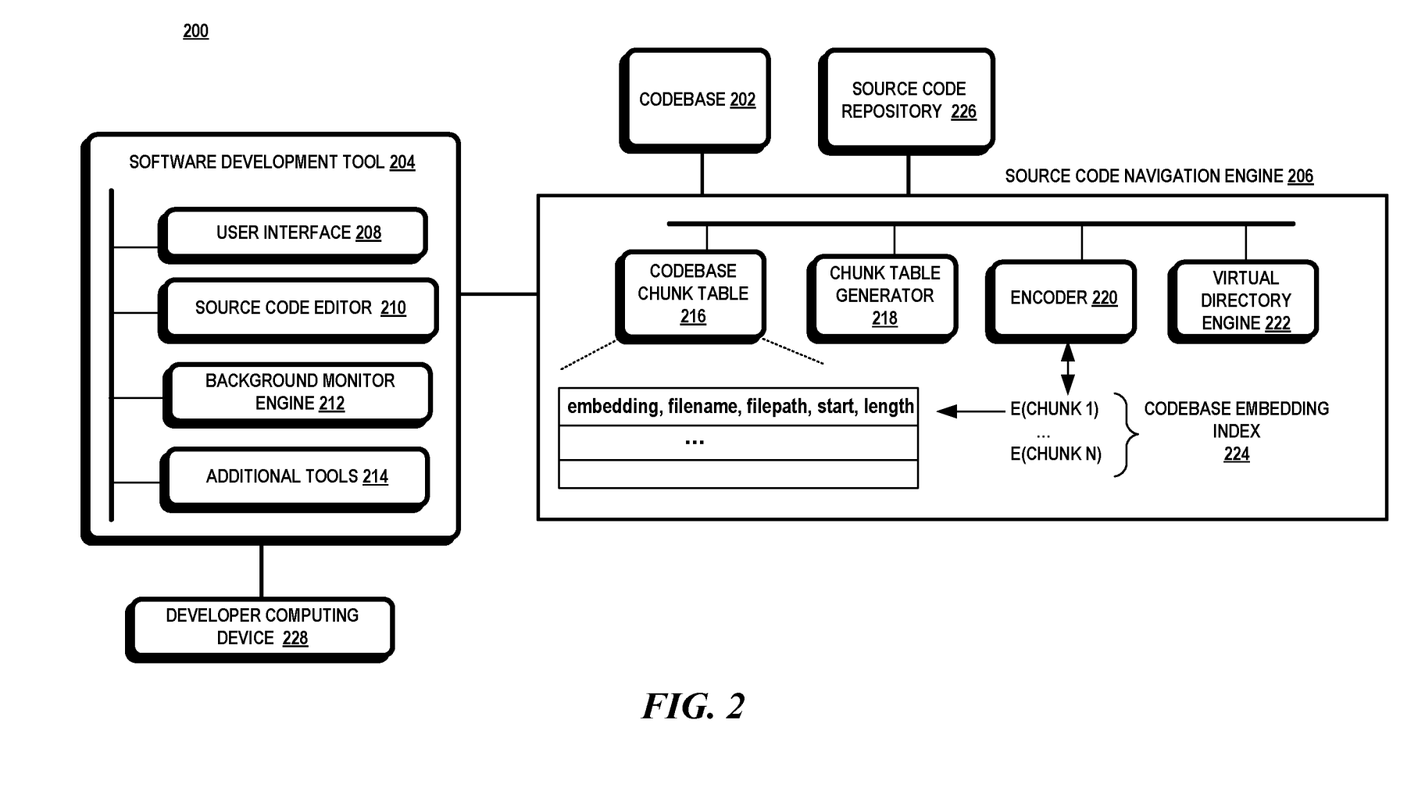
FIG. 2 illustrates an example of a system for source code navigation using a virtual directory.

FIG. 2 illustrates an example of a system 200 utilizing the virtual directory for source code navigation. In an aspect, the system 200 utilizes a codebase 202, a software development tool 204, a source code navigation engine 206 and a version-controlled shared source code repository 226.

The codebase 202 is a collection of related files for a program, application or service that includes the files used to compile, test, maintain, configure, and/or build the program, application or service, such as, without limitation, script files, readme files, license info files, documentation files, templates, etc. The codebase may be hosted on a shared source code repository in a version control system (i.e., GitHub/Git), local repository, cloud service, or web server, etc.

The software development tool 204 is an application used to create, maintain, debug, edit, or otherwise support the development of a software program. Exemplary software development tools include integrated development environments, such as Visual Studio®, Eclipse®, Cloud9 IDE®, NetBeans®, etc., browsers, source code editors, etc.

The software development tool 204 includes a user interface 208, one or more source code editors 210, a background monitor engine 212, and additional tools and program 214, such as compilers, parsers, etc. (not shown). The user interface 208 is a program that allows a developer to interact with the software development tool 204. The user interface 208 contains display screens consisting of graphical user interface elements, such as windows, buttons, menus, etc. A source code editor 210 is a program designed for creating and editing a computer program. The background monitor engine 212 is a program that runs in a background process to monitor for various user actions such as edits made to a file of the codebase.

The source code navigation engine 206 performs a search for code components that pertain to the query, automatically updates the virtual directory, and outputs the virtual directory to a version-controlled shared source code repository. In an aspect, the source code navigation engine 206 includes a codebase chunk table 216, a chunk table generator 218, an encoder 220, a virtual directory engine 222, and a codebase embedding index 224.

The chunk table generator 218 extracts chunks from each file of the codebase 202. A chunk is a portion of a file having a pre-configured size (e.g., 4 kilobytes of tokens). The size may be determined by the user or the system to achieve a particular performance. In some aspects, the size is based on the number of tokens the context window of the encoder can receive in a single input.

A file is transformed into a sequence of tokens from which the chunks are extracted. The encoder 220 takes a chunk and produces a fixed-length vector representation referred to as an embedding or encoding. The embedding captures the semantic, syntactic and structural relationships between the tokens and places similar inputs close together in an embedding space. An embedding space is a space into which the embeddings are mapped. In an aspect, the same encoder is used to generate the chunk embeddings and the query embeddings from the same embedding space.

In an aspect, the encoder 108 is a neural-based model, such as without limitation, an encoder-only neural transformer model with attention. An exemplary neural encoder is the Bidirectional Encoder Representations from Transformers (BERT) model. BERT is a neural transformer model with attention that reads an input token sequence of source code in both directions at the same time. The bidirectional approach allows the model to understand the context of a token based on all of its surrounding tokens not just the tokens before it. This makes the model effective at capturing the semantic relationships into a token embedding.

It should be noted that other neural encoders may be used such as Embeddings from Language Model (ELMo) or any of the encoders provided by OpenAI.

The encoder 220 generates an embedding for each chunk which is then used as an index into the codebase chunk table 216. A codebase embedding index 224 is used to access a respective chunk based on a similarity between the chunk embedding to an embedding of the query.

The codebase embedding index 224 is used to perform a quick search on the codebase chunk table 216. In an aspect, the codebase embedding index 224 is configured as an approximate nearest neighbor (ANN) tree data structure. The ANN data structure or embedding tree index 224 takes the embedding of a query and returns a ranked list of embeddings closely matching the query embedding.

The codebase chunk table 216 contains an entry for each chunk consisting of the corresponding embedding of the chunk, the filename of the file containing the chunk, the filepath to the physical location of the file, the starting line number in the file where the chunk begins and the length of the chunk in line numbers. Each entry into the codebase chunk table 216 is indexed by an embedding of the respective chunk.

The chunk table generator 218 generates the chunks for each file of the codebase, generates an embedding of each chunk, and constructs the codebase chunk table and codebase embedding index 224. The chunk table generator 218 updates the chunks in the codebase chunk table 216 and the codebase embedding index 224 when an edit is made to a chunk.

The virtual directory engine 222 interacts with the software development tool 204 to generate the virtual directory for a query, to perform the source code navigation or search, to initiate creation of the codebase chunk table 216, to update the virtual directory and codebase chunk table with changes made to one or more chunks.

In addition, the virtual directory engine 222 interacts with a shared source code repository 226 to store the virtual directory so that it may be accessed by other developers. The shared source code repository 226 is a file archive and web hosting facility that stores large amounts of source code either privately or publicly. The shared source code repository can be structured as a version control system, such as GIT, Mercurial, etc.

In one or more aspects, the source code navigation engine 206 may be a function or feature integrated into a source code editor, an integrated development environment, browser, or other application. The source code navigation engine 206 may be embodied as a tool or feature that can be an add-on, plug-in, extension and/or component of a source code editor, IDE, browser or the like.

Methods

Attention now turns to description of the various examples of methods that utilize the system and device disclosed herein. Operations for the aspects may be further described with reference to various examples of methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
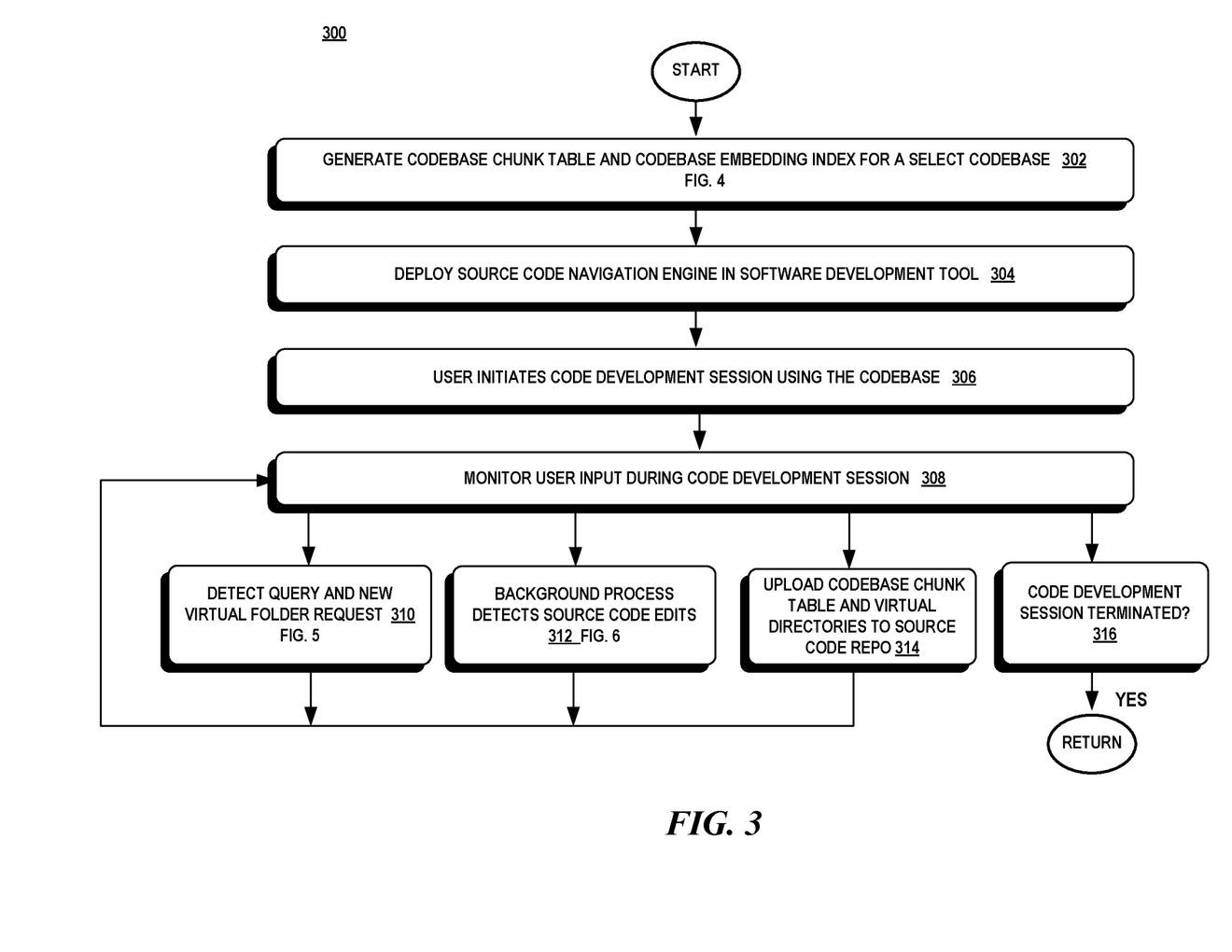
FIG. 3 is a flow chart illustrating an example of a exemplary method of a user interface of a code development session that supports source code navigation using virtual directories.

FIG. 3 illustrates an example of a method 300 of the system. Initially, the codebase chunk table is generated for a particular codebase (block 302). The chunk table generator scans each file in a codebase and generates the codebase chunk table and codebase embedding index (block 302). The source code navigation engine, including the codebase chunk table, the chunk table generator, the encoder, and virtual directory engine, are then deployed in a software development tool (block 304).

A user initiates a session with the software development tool using the codebase (block 306). The actions of the user are monitored during the user's session with the software development tool (block 308). If the user interface detects natural language input into the query box (block 310), then the user interface notifies the source code navigation engine to initiate actions to generate a new virtual directory (block 310). If the source code editor detects changes made to the codebase, then the source code editor notifies the source code navigation engine to initiate actions to update the codebase chunk table, the codebase embedding index, and/ or the virtual directory (block 312).

Upon user input, the source code navigation engine uploads the virtual directory to a shared source code repository (block 314). Upon detection of the session with the software development tool ending (block 316), the method terminates (block 316). Otherwise, the method repeats blocks 308 through 316 until the session terminates (block 316).

Figure 4:
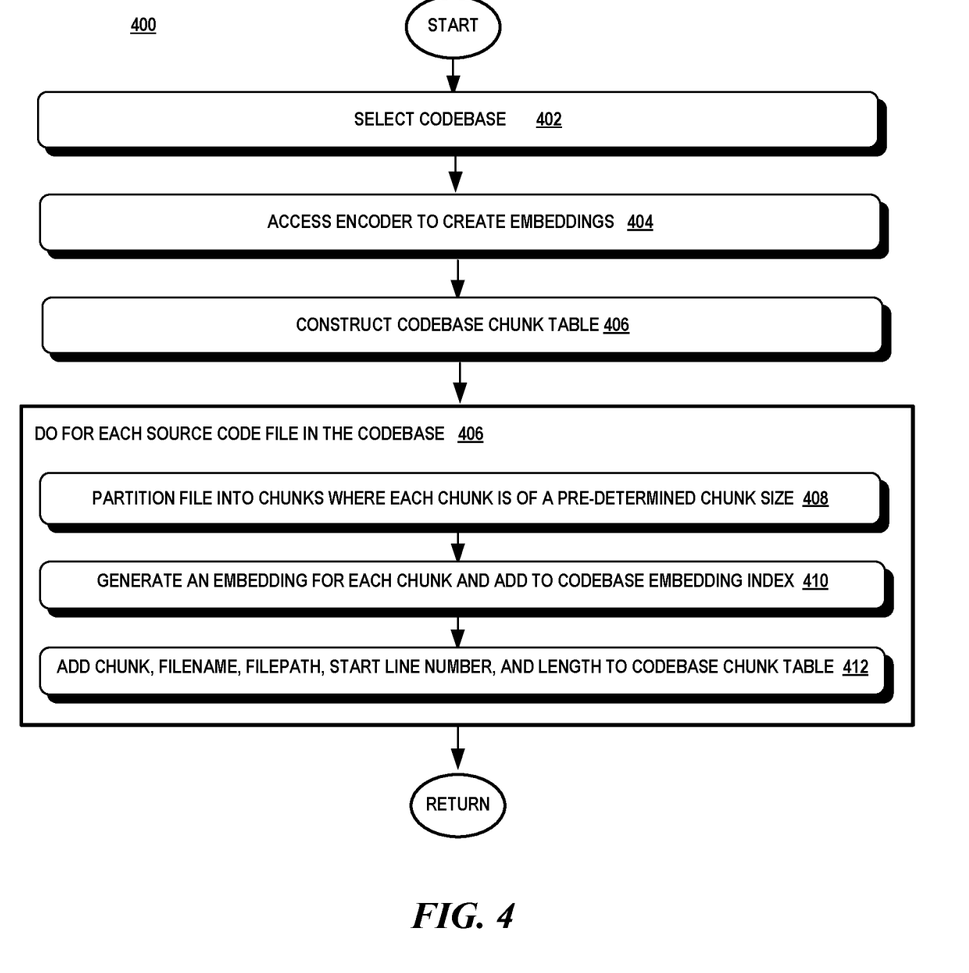
FIG. 4 is a flow chart illustrating an example of a method for the generation of the codebase embedding index and codebase chunk table.

Turning to FIG. 4, there is shown an example of a method 400 for generating the codebase chunk table and the codebase embedding index. Initially, a codebase is selected from which the codebase chunk table and codebase embedding index are generated (block 402). An encoder is accessed to create the embeddings (block 404). The chunk table generator scans each file of the codebase (block 406) and transforms the contents of the file into a sequence of tokens (block 408). The chunk table generator extracts a predetermined number of an ordered sequence of tokens into a chunk (block 408) and uses the encoder to generate an embedding of the chunk (block 410). The chunk embedding is used to index the codebase chunk table which contains the location of the source code component (e.g., file, function, class, or type) that is closely similar to the query embedding (block 410). The chunk table generator generates an entry in the codebase chunk table to include the filename, filepath, starting line number of the chunk in the file, and length of the chunk (block 412).

Figure 5:
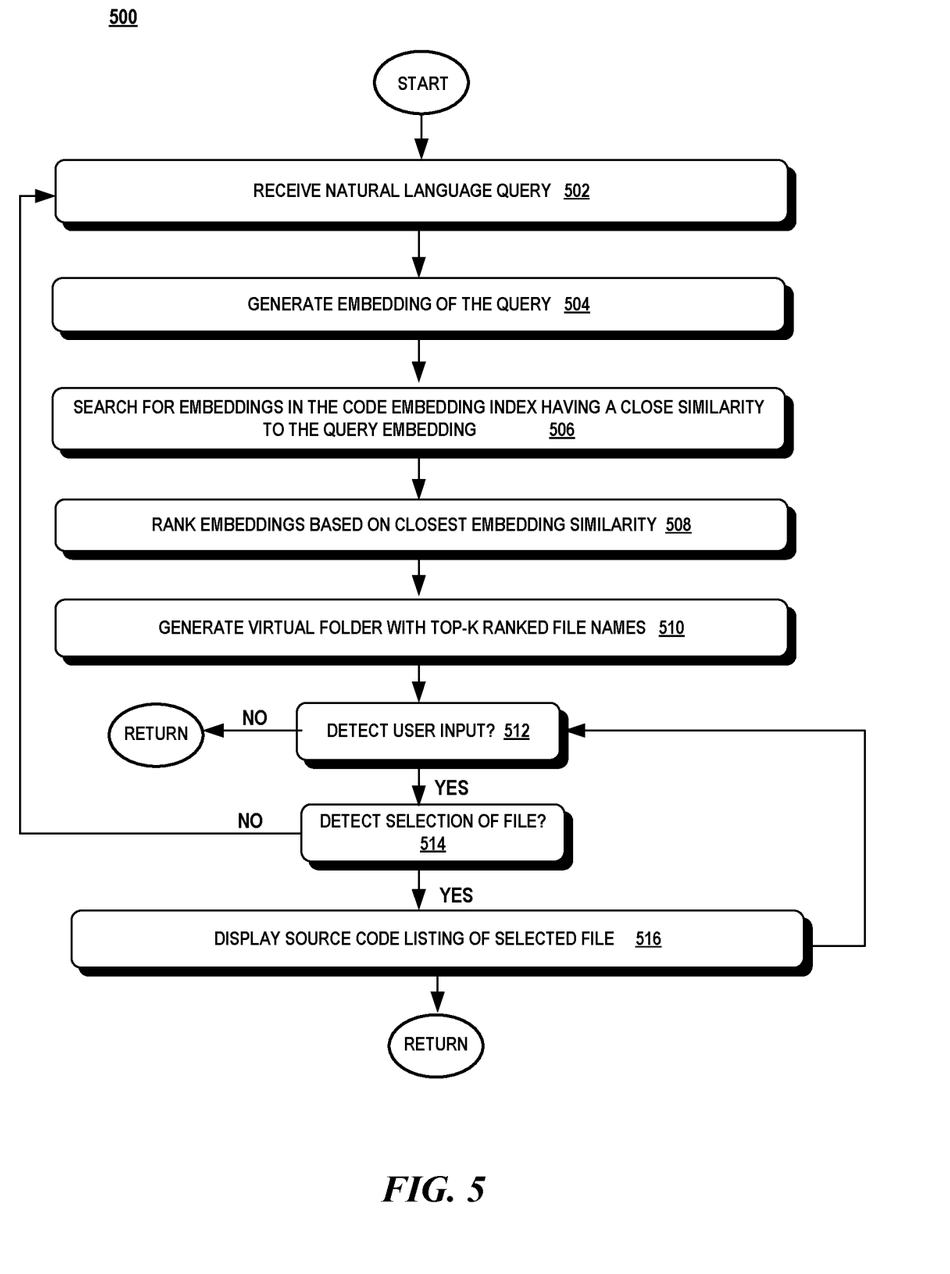
FIG. 5 is a flow chart illustrating an example of a method for performing a code search on a codebase.

FIG. 5 illustrates an example of a method for performing the source code navigation in a software development tool. The user interface receives a search request in the form of a natural language query (block 502). The query pertains to the source code components of the codebase (block 502). The encoder generates an embedding of the natural language query (block 504).

In an aspect, the virtual folder engine uses the codebase embedding index to search for chunk embeddings that are closely similar to the query embedding (block 506). In an aspect, the search uses an approximate nearest neighbor search algorithm on the codebase embedding index to find the embeddings in the codebase chunk table having the closest similarity to the query embedding. The chunks associated with the closest similar embeddings to the query embedding are selected and ranked according to embedding similarity (block 508).

In another aspect, the virtual folder engine searches for embeddings in the codebase chunk table having a close similarity to the query embedding using a distance measure such as a cosine similarity. The cosine similarity measures the distance between each embedding in the codebase embedding table and the query embedding to find the embeddings that are closest to the query embedding. The cosine similarity for each chunk embedding of a file is computed. The cosine similarity generates a value between −1 and 1. The largest positive cosine similarity value overall the chunks for a file is then used to determine the percentage that the file is similar to the query.

In an aspect, a top-k threshold is provided that limits the number of chunks that are provided to the user. The chunks having the closest similar embeddings are provided to the user and is a user-defined integer value denoted as k (block 508). In addition, a match threshold may be provided that sets a limit on the number of chunks provided to the user based on the percentage that the chunk is similar to the query. For example, only consider chunks having at least a 75% match or similarity to the user query embedding (block 508).

Figure 6:
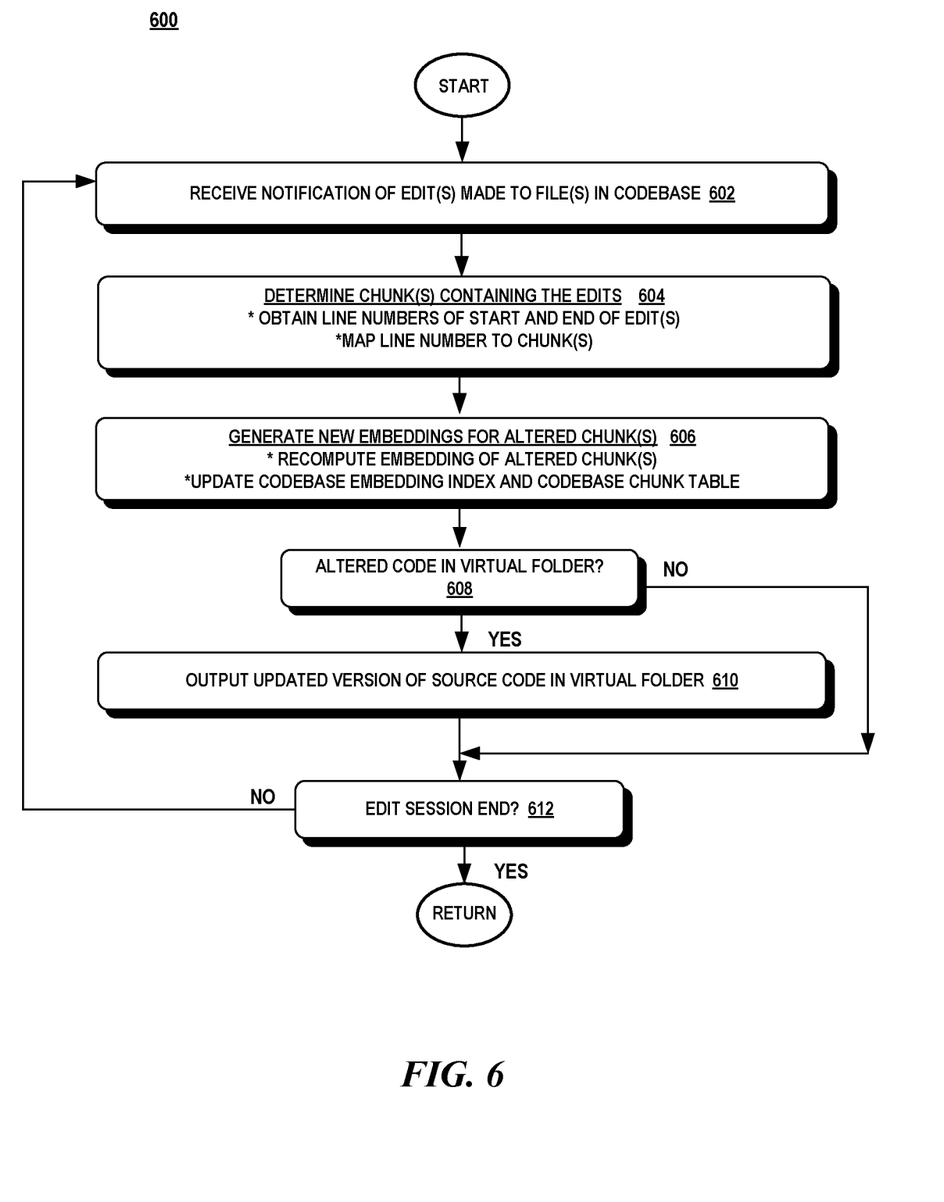
FIG. 6 is a flow chart illustrating an example of a method of updating the codebase embedding index and codebase chunk table for edits made to a file of the codebase.

FIG. 6 illustrates an example of a method 600 for updating the chunks when edits are made to a file of the codebase. The virtual directory engine receives notifications from the source code editor when edits are made to a file of the codebase (block 602). The edits may affect one or more chunks.

At certain points in the edit session, the background monitor engine may detect a user input (block 512) which may be a selection of one of the source code components stored in the virtual directory (block 514—yes) or another query (blocks 514—no, 502). If the user input selected one of the source code components listed in the virtual directory, the virtual folder engine displays the source code of the selected component in the source code editor (block 516). The method repeats monitoring for user input until the edit session terminates (block 512—no).

FIG. 6 illustrates an exemplary method 600 for updating the chunks when edits are made to a file of the codebase. The virtual directory engine receives notifications from the source code editor when edits are made to a file of the codebase (block 602). The edits may affect one or more chunks.

The chunks containing the edited code are identified (block 604). In an aspect, the source code editor provides line numbers of the edits which are then used to search the codebase chunk table for the corresponding chunk or chunks that correspond to the edited portion of the file. The codebase chunk table contains the line numbers of each chunk which is used to identify the edited chunks.

Once the edited chunk or chunks are identified, new embeddings are generated for each altered chunk (block 606). The updated embeddings are stored in the codebase embedding index and codebase chunk table (block 606).

Figure 7:
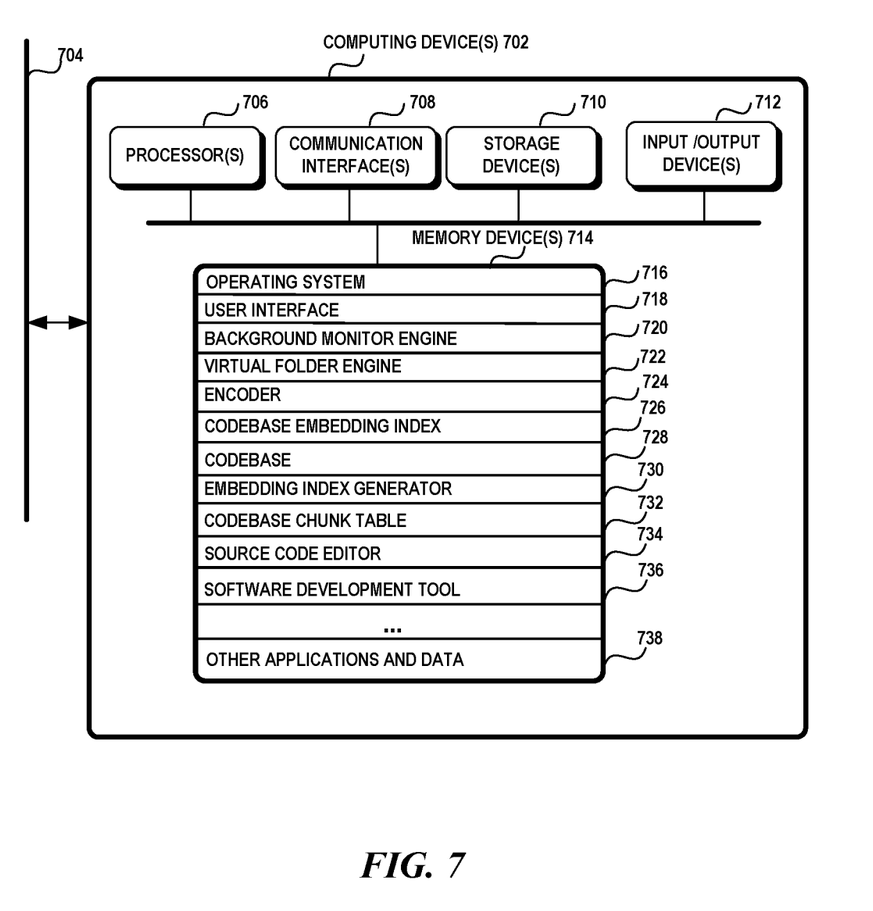
FIG. 7 is a block diagram illustrating an example of an operating environment.

Attention now turns to a discussion of an example of an operating environment. FIG. 7 illustrates an example of an operating environment 700. In one embodiment, the source code navigation engine, the software development tool and the codebase may reside on a single computing device. In an alternate embodiment, the source code navigation engine, the software development tool, and the codebase may each reside on separate devices and communicate via a network. The source code navigation engine and/or the software development tool may be configured as a cloud service that interacts with a developer's computing device.

Exemplary Operating Environment

Attention now turns to a discussion of an exemplary operating environment. FIG. 7 illustrates an exemplary operating environment 700. In one embodiment, the source code navigation engine, the software development tool and the codebase may reside on a single computing device. In an alternate embodiment, the source code navigation engine, the software development tool, and the codebase may each reside on separate devices and communicate via a network. The source code navigation engine and/or the software development tool may be configured as a cloud service that interacts with a developer's computing device.

The operating environment 700 includes a computing device 702 communicatively coupled to a network 704. The computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 700 may be configured in a network environment, a distributed environment, a multi-processor environment, or a stand-alone computing device having access to remote or local storage devices.

The computing device 702 may include one or more processors 706, one or more communication interfaces 708, one or more storage devices 710, one or more input/output devices 712, and one or more memory devices 714. A processor 706 may be any commercially available or customized processor and may include dual microprocessors and multi-processor architectures. A communication interface 708 facilitates wired or wireless communications between the computing device 702 and other devices. A storage device 710 may be a computer-readable medium that does not contain propagating signals, such as modulated data signals transmitted through a carrier wave. Examples of a storage device 710 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 710 in a computing device 702. The input/output devices 712 may include a keyboard, mouse, pen, voice input device, touch input device, display, speakers, printers, etc., and any combination thereof.

A memory device or memory 714 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 714 may also include one or more external storage devices or remotely located storage devices that do not pertain to propagated signals, such as modulated data signals transmitted through a carrier wave.

The memory device 714 may contain instructions, components, and data. A component is a software program that performs a specific function and is otherwise known as a module, program, component, and/or application. Memory device 714 may include an operating system 716, a user interface 718, a background monitor engine 720, a virtual folder engine 722, an encoder 724, a codebase embedding index 726, a codebase 728, an embedding index generator 730, a codebase chunk table 732, a source code editor 734, a software development tool 736, and other applications and data 738.

The network 704 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 704 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed is an improvement to the functioning of a computer. In an aspect, the techniques described herein pertain to the reduction of user input to a computing device to search a codebase for source code components (e.g., function, type, class) that satisfy a user query. The technical features associated with addressing this problem is the use of chunk embeddings to represent the code components of the codebase and to build an index for efficiently retrieving the chunks that are closely-similar to an embedding of the user query. The technical effect achieved is the efficient retrieval of the source code components from the various files of a codebase that satisfy the user query thereby improving the functioning of the computer in performing this task.

CONCLUSION

The techniques described incorporate an embedding space and a codebase embedding index that improve the functioning of a computer. In particular, the embedding space and embedding index significantly improve the functioning of the computer since the search is based on embeddings. The embeddings incorporate the structure and semantics of the user query, which when used in the search, find code chunks having a similar meaning to the user query. This is an improvement over conventional solutions that search using keywords in a query that are found in a code snippet without any relation to the meaning of the context where the keywords are found. The technique described herein utilizes embeddings of the query and the chunk which are effective at searching based on the semantics of the query and code chunk rather than keywords taken in isolation of a context.

In addition, the techniques described herein are an improvement over a direct filesystem organization or manual curation of topical virtual directories using an IDE's project system since the techniques allows for a direct description of the purpose of the virtual directory using natural language. In addition, the technique provides for the contents of the virtual directory and the embedding index to be updated in real time as the codebase changes. This reduces the effort developers need to put into maintaining their directory structure. It also makes it easier for developers that are new to a codebase to quickly understand which pieces are relevant to their work because they can use natural language queries.

One of ordinary skill in the art understands that the techniques disclosed herein are inherently digital. The operations to search the codebase chunk table, the generation of the codebase chunk table and embedding index, and the application of source code navigation engine to generate answers to a query are inherently digital. The human mind cannot interface directly with a CPU or network interface card, or other processor, or with RAM or other digital storage, to read or write the necessary data and perform the necessary operations disclosed herein.

The embodiments are also presumed to be capable of operating at scale, within tight timing constraints in production environments (e.g., integrated development environment), and in testing labs for production environments as opposed to being mere thought experiments.

A system is disclosed for source code navigation of a codebase during an edit session in a software development tool. The system comprises a processor and a memory that stores a program configured to be executed by the processor. The program comprises instructions that when executed by the processor perform acts that: receive a query for a source code component of the codebase; encode the query using an encoder to generate an embedding of the query in an embedding space; create a virtual directory in a user interface of the software development tool, wherein the virtual directory stores links to one or more files of the codebase having a source code component related to the query, each source code component being represented using an embedding in the embedding space; search for the one or more files having source code components related to the query, wherein the search finds a source code component of the codebase having an embedding that is similar to the embedding of the query; output filenames of the one or more files having the source code components related to the query in the virtual directory of the user interface; detect user input selecting one of the output filenames; and display the source code component associated with the select one of the output filenames in the user interface.

In an aspect, the program comprises instructions that when executed by the processor perform acts that: rank the one or more files having source code components similar to the embedding of the query based on closest embedding similarity; and select top-k files to output in the virtual directory based on the ranking.

In an aspect, the virtual directory is dynamically-created in response to receipt of the user query, wherein the virtual directory comprises a name including words of the user query.

In an aspect, the program comprises instructions that when executed by the processor perform acts that: generate the embeddings of the query and the embeddings of the source code components using a neural transformer with attention.

In an aspect, the source code components of the codebase comprise a file, function, class, and/or type. In an aspect, the program comprises instructions that when executed by the processor perform acts that: store the virtual directory in a version-controlled shared source code repository.

In an aspect, the program comprises instructions that when executed by the processor perform acts that: monitor changes made to content of the one or more files having source code components in the virtual directory; and update the embeddings of the source code components of the files of the virtual directory.

A computer-implemented method for source code navigation of a codebase during a software development session in a software development tool is disclosed, comprising: obtaining a query for a source code component of the codebase; accessing a plurality of chunks of the codebase, wherein a chunk represents a portion of a file of the codebase; associating an embedding of an embedding space with each chunk of the plurality of chunks; generating an embedding of the query in the embedding space; searching the plurality of chunk embeddings for a chunk embedding similar to the query embedding; selecting a file of the codebase associated with the chunk embedding having a similar embedding as the query embedding; creating a virtual directory that references the selected file in a user interface of the software development tool; receiving user input to display the source code component in the selected file; and displaying the source code component of the selected file in the user interface of the software development tool.

In an aspect, a chunk of the plurality of chunks represents a fixed-length sequence of tokens extracted from a contiguous portion of a file of the codebase. In an aspect, the computer-implemented method further comprises: providing the virtual directory with a name containing the query.

In an aspect, the computer-implemented method further comprises: accessing a neural encoder to generate the embedding of the query and the chunk embeddings. In an aspect, the computer-implemented method further comprises: storing the virtual directory in a version-controlled shared source code repository. In an aspect, the computer-implemented method further comprises: detecting an edit to the selected file; and updating the embedding of the chunks associated with the edit.

In an aspect, the computer-implemented method comprises updating the virtual directory with the edited selected file. In an aspect, the source code components comprise at least one of: a function, method, type or class.

A hardware storage device is disclosed having stored thereon computer executable instructions that are structured to be executable by a processor of a computing device to thereby cause the computing device to perform actions that: provide a virtual directory in a user interface of a software development tool, wherein the virtual directory references files having results of a query related to source code components contained in files of a codebase; represent contents of the files of the codebase as a plurality of chunks, wherein a chunk of the plurality of chunks is represented by a chunk embedding; receive a query pertaining to a target source code component of the codebase; generate an embedding of the query; search the plurality of chunks for chunk embeddings similar to the query embedding; obtain the files corresponding to the chunk embeddings that are similar to the query embedding; output filenames of the files corresponding to the chunk embeddings that are similar to the query embedding in the virtual directory; and display a user-selected file of the output filenames containing the target source code component in the user interface.

In an aspect, the hardware storage device has stored thereon computer executable instructions that are structured to be executable by a processor of a computing device to thereby cause the computing device to perform actions that: rank the files corresponding to the chunk embedding similar to the query embedding based on a closest similarity to the query embedding; and display the files in the ranked order.

In an aspect, the hardware storage device has stored thereon computer executable instructions that are structured to be executable by a processor of a computing device to thereby cause the computing device to perform actions that: generate a name for the virtual directory comprising words of the query.

In an aspect, the hardware storage device has stored thereon computer executable instructions that are structured to be executable by a processor of a computing device to thereby cause the computing device to perform actions that: upload the virtual directory to a version-controlled shared source code repository. In an aspect, the source code components comprise one or more of: a function, method, class or type.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for source code navigation of a codebase during an edit session in a software development tool, comprising:
   a processor, and
   a memory that stores a program configured to be executed by the processor, the program comprising instructions that when executed by the processor perform acts that:
   receive a query for a source code component of the codebase during the edit session in the software development tool;
   encode the query using an encoder to generate an embedding of the query in an embedding space;
   create a virtual directory in a user interface of the software development tool, wherein the virtual directory stores filenames of one or more files of the codebase having a source code component related to the query, each source code component of the codebase associated with an embedding in the embedding space, wherein the virtual directory comprises a name including the query;
   search for the one or more files having source code components related to the query, wherein the search finds a source code component of the codebase having an embedding that is similar to the embedding of the query;
   output filenames of the one or more files having the source code components related to the query in the virtual directory of the user interface;
   upon detection of user input selecting one of the output filenames in the virtual directory, display the source code component associated with the select one of the output filenames in the user interface;
   monitor changes made to a select one of the one or more files having source code components related to the query in the virtual directory; and
   update the embeddings of the source code components of the select one of the one or more files having source code components in the virtual directory.

2. The system of claim 1, wherein the program comprises instructions that when executed by the processor perform acts that:
   rank the one or more files having source code components similar to the embedding of the query based on closest embedding similarity; and
   select top-k files to output in the virtual directory based on the ranking.

3. The system of claim 1, wherein the virtual directory is dynamically-created in response to receipt of the user query, wherein the virtual directory comprises a name including words of the user query.

4. The system of claim 1, wherein the program comprises instructions that when executed by the processor perform acts that:
   generate the embeddings of the query and the embeddings of the source code components using a neural transformer with attention.

5. The system of claim 1, wherein the source code components of the codebase comprise a file, function, class, and/or type.

6. The system of claim 1, wherein the program comprises instructions that when executed by the processor perform acts that:
   store the virtual directory in a version-controlled shared source code repository.

7. The system of claim 2, wherein the program comprises instructions that when executed by the processor perform acts that:
   display the one or more files having source code components similar to the embedding of the query in the ranked order.

8. A computer-implemented method for source code navigation of a codebase during a software development session in a software development tool, comprising:
   obtaining a query for a source code component of the codebase;
   accessing a plurality of chunks of the codebase, wherein a chunk represents a portion of a file of the codebase;

associating an embedding of an embedding space with each chunk of the plurality of chunks;

generating an embedding of the query in the embedding space;

searching the plurality of chunk embeddings for a chunk embedding similar to the query embedding;

selecting a file of the codebase associated with the chunk embedding having a similar embedding as the query embedding;

creating a virtual directory that references the selected file of the codebase associated with the chunk embedding having a similar embedding as the query embedding in a user interface of the software development tool, wherein the virtual directory comprises a name including the query;

upon receiving user input to display a source code component in the selected file displaying the source code component of the selected file in the user interface of the software development tool;

monitoring a change made to the selected file of the codebase having the similar embedding to the query embedding; and updating the selected file of the codebase having the change made in the virtual directory.

9. The computer-implemented method of claim 8, wherein a chunk of the plurality of chunks represents a fixed-length sequence of tokens extracted from a contiguous portion of a file of the codebase.

10. The computer-implemented method of claim 8, comprising:

updating the chunk embeddings of the selected file of the codebase having the similar embedding to the query embedding upon detection of the change made to the selected file.

11. The computer-implemented method of claim 8, comprising:

accessing a neural encoder to generate the embedding of the query and the chunk embeddings.

12. The computer-implemented method of claim 8, comprising:

storing the virtual directory in a version-controlled shared source code repository.

13. The computer-implemented method of claim 8, comprising:

ranking files having chunk embeddings similar to the embedding of the query based on closest embedding similarity; and select top-k files to output in the virtual directory based on the ranking.

14. The computer-implemented method of claim 13, comprising:

displaying the ranked files in the virtual directory based on the ranking.

15. The computer-implemented method of claim 8, wherein the source code components comprise at least one of: a function, method, type or class.

16. A hardware storage device having stored thereon computer executable instructions that are structured to be executable by a processor of a computing device to thereby cause the computing device to perform actions that:

provide a virtual directory in a user interface of a software development tool, wherein the virtual directory references files having results of a query related to source code components contained in files of a codebase, wherein the virtual directory comprises a name including the query;

represent contents of the files of the codebase as a plurality of chunks, wherein a chunk of the plurality of chunks is represented by a chunk embedding;

receive a query pertaining to a target source code component of the codebase;

generate an embedding of the query;

search the plurality of chunks for chunk embeddings similar to the query embedding;

obtain the files corresponding to the chunk embeddings that are similar to the query embedding;

output filenames of the files corresponding to the chunk embeddings that are similar to the query embedding in the virtual directory;

monitor a change made to the selected file of the codebase having the similar embedding to the query embedding; and update, in the virtual directory, the selected file of the codebase having the change.

17. The hardware storage device of claim 16, having stored thereon computer executable instructions that are structured to be executable by a processor of a computing device to thereby cause the computing device to perform actions that:

rank the files corresponding to the chunk embedding similar to the query embedding based on a closest similarity to the query embedding; and display the files in the virtual directory in the ranked order.

18. The hardware storage device of claim 16, having stored thereon computer executable instructions that are structured to be executable by a processor of a computing device to thereby cause the computing device to perform actions that:

update the chunk embeddings of the selected file of the codebase having the similar embedding to the query embedding upon detection of the change made to the selected file.

19. The hardware storage device of claim 16, having stored thereon computer executable instructions that are structured to be executable by a processor of a computing device to thereby cause the computing device to perform actions that:

upload the virtual directory to a version-controlled shared source code repository.

20. The hardware storage device of claim 16, wherein the source code components comprise one or more of: a function, method, class or type.

* * * * *